United States Patent
Gande et al.

(10) Patent No.: US 9,081,749 B2
(45) Date of Patent: Jul. 14, 2015

(54) AUTOMATIC LANGUAGE SENSITIVE, EVENT BASED ACTIVITY FEEDS

(75) Inventors: Ajith Kumar Gande, Bothell, WA (US); Oleksiy Vlasenko, Bellevue, WA (US); Xiaodond La, Kirkland, WA (US); Elliot Stephenson Lewis, Bellevue, WA (US); Nick Thomson, Redmond, WA (US); Karin Zimprich, Bellevue, WA (US); Manisha Powar, Redmond, WA (US); Nick Patrick, Boston, MA (US); Andriy Mykolaiovych Smertin, Bellevue, WA (US); Maya Widyasari, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 700 days.

(21) Appl. No.: 13/316,565

(22) Filed: Dec. 12, 2011

(65) Prior Publication Data

US 2013/0151233 A1 Jun. 13, 2013

(51) Int. Cl.
*G06F 17/28* (2006.01)
*G06F 17/20* (2006.01)
*G10L 21/00* (2013.01)

(52) U.S. Cl.
CPC ..................................... *G06F 17/20* (2013.01)

(58) Field of Classification Search
CPC ....... G06F 17/289; G06F 17/28; G06F 3/167; G06F 17/2863; G06F 17/2854; G06F 9/4448; G06F 17/275; G06F 17/2818; G06F 17/2809; G06F 17/246; G06F 17/27; G06F 17/2836; G06F 17/30427; G06F 17/3043; G06F 17/3066; G10L 15/22; G10L 17/22; G10L 15/1822; G10L 15/063; G10L 2015/0631; G10L 2015/088
USPC .................. 704/2, 3, 4, 5, 8, 270, 270.1, 275
See application file for complete search history.

(56) References Cited

U.S. PATENT DOCUMENTS

| | | | |
|---|---|---|---|
| 7,177,793 B2 * | 2/2007 | Barker et al. ..................... 704/8 |
| 7,346,630 B2 | 3/2008 | Eichstaedt et al. | |
| 7,669,123 B2 | 2/2010 | Zuckerberg et al. | |
| 8,126,701 B2 * | 2/2012 | Beck ................................. 704/8 |
| 8,412,512 B1 * | 4/2013 | Wren et al. ....................... 704/3 |
| 8,538,742 B2 * | 9/2013 | Wren et al. ....................... 704/2 |
| 2005/0240393 A1 * | 10/2005 | Glosson ............................ 704/8 |
| 2005/0267973 A1 * | 12/2005 | Carlson et al. ................. 709/228 |

(Continued)

OTHER PUBLICATIONS

"Set up My Sites (SharePoint Server 2010)", Retrieved at <<http://technet.microsoft.com/en-us/library/ee624362.aspx>>, Retrieved Date: Sep. 15, 2011, pp. 11.

(Continued)

*Primary Examiner* — Edgar Guerra-Erazo
(74) *Attorney, Agent, or Firm* — Damon Rieth; Jim Ross; Micky Minhas

(57) ABSTRACT

A post is generated that identifies different types of activity in a computer system, such as changes to the data in the computer system. The post is generated in a language-neutral way. An activity feed generator generates a language-specific post and distributes it, in an activity feed, to a set of users, based on user preferences. The activity feed generator can also access a security model so that only users with sufficient privileges receive the post in their activity feed.

20 Claims, 13 Drawing Sheets

(56) References Cited

U.S. PATENT DOCUMENTS

| | | |
|---|---|---|
| 2006/0230061 A1 | 10/2006 | Sample et al. |
| 2007/0005339 A1* | 1/2007 | Jaquinta .............................. 704/8 |
| 2007/0124200 A1* | 5/2007 | Simons et al. .................. 705/14 |
| 2008/0046231 A1* | 2/2008 | Laden et al. ....................... 704/8 |
| 2008/0147378 A1* | 6/2008 | Hall ................................. 704/4 |
| 2009/0083025 A1* | 3/2009 | Hauduc et al. .................... 704/8 |
| 2009/0222348 A1 | 9/2009 | Ransom et al. |
| 2009/0288001 A1 | 11/2009 | Hamilton et al. |
| 2010/0063969 A1 | 3/2010 | Kasargod et al. |
| 2010/0241579 A1* | 9/2010 | Bassett et al. ................. 705/319 |
| 2011/0125485 A1* | 5/2011 | Prakash et al. .................... 704/3 |
| 2011/0231478 A1* | 9/2011 | Wheeler et al. ................ 709/203 |
| 2012/0102114 A1* | 4/2012 | Dunn et al. .................... 709/204 |
| 2012/0102153 A1* | 4/2012 | Kemp et al. .................... 709/219 |
| 2012/0109631 A1* | 5/2012 | Gopal et al. ....................... 704/3 |
| 2012/0296628 A1* | 11/2012 | Wren et al. ....................... 704/2 |
| 2014/0067364 A1* | 3/2014 | Wren et al. ....................... 704/2 |

OTHER PUBLICATIONS

"Simplenews: Send newsletters to subscribed e-mail addresses", Retrieved at <<http://drupal.org/node/197057>>, Retrieved Date: Sep. 15, 2011, pp. 5.

* cited by examiner

AUTOMATIC LANGUAGE SENSITIVE, EVENT BASED ACTIVITY FEEDS

BACKGROUND

Currently, there are a wide variety of different types of software systems deployed in various architectures. For instance, some software systems are deployed in a networked architecture in which people at various locations can use, and make changes to, the software system. Sometimes, the users of the software system are located in remote geographic areas and even have different native languages.

As one specific example, customer relations management systems are currently in wide use. These types of systems often employ data entities or objects that define items within the system. For instance, some entities often found in a customer relations management (CRM) system include "account" entities that define various features of an account, "customer" entities that define various features of a customer, "sales" entities that define various features of sales that can occur during a sales process, and many other entities or objects. When one user of the CRM system makes a change to a given object, it may be of interest to other users of the CRM system. For instance, if Jane Doe is working on a sale, and changes the status of the sale object from "pending" to "closed", this may be of interest to another user who is monitoring sales activity of the company.

It is currently difficult for all users of a system (such as the CRM system described above) to view activity on the system. It can be even more problematic when the users are distributed across various geographic regions that use different languages. For instance, if Jane Doe is attempting to make a sale to a client in the United States, and Jane Doe updates the status of a "sales" object, in English, it may be difficult for a user of that same CRM system in Russia (such as in a Russian office of Jane Doe's company) to monitor the change in status, because of the different languages used by the different users.

Activity feed systems are also currently in wide use. In an activity feed system, users are connected to one another as nodes in a graph, based on various types of interdependency. When one user provides an input to the activity feed system, the other users, that are connected to the first user in the graph, receive a post on a user interface display (such as the user's wall) that reflects the activity of the first user.

The discussion above is merely provided for general background information and is not intended to be used as an aid in determining the scope of the claimed subject matter.

SUMMARY

A post is generated that identifies different types of activity in a computer system, such as changes to the data in the computer system. The post is generated in a language-neutral way. An activity feed generator generates a language-specific post and distributes it, in an activity feed, to a set of users, based on user preferences. The activity feed generator can also access a security model so that only users with sufficient privileges receive the post in their activity feed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
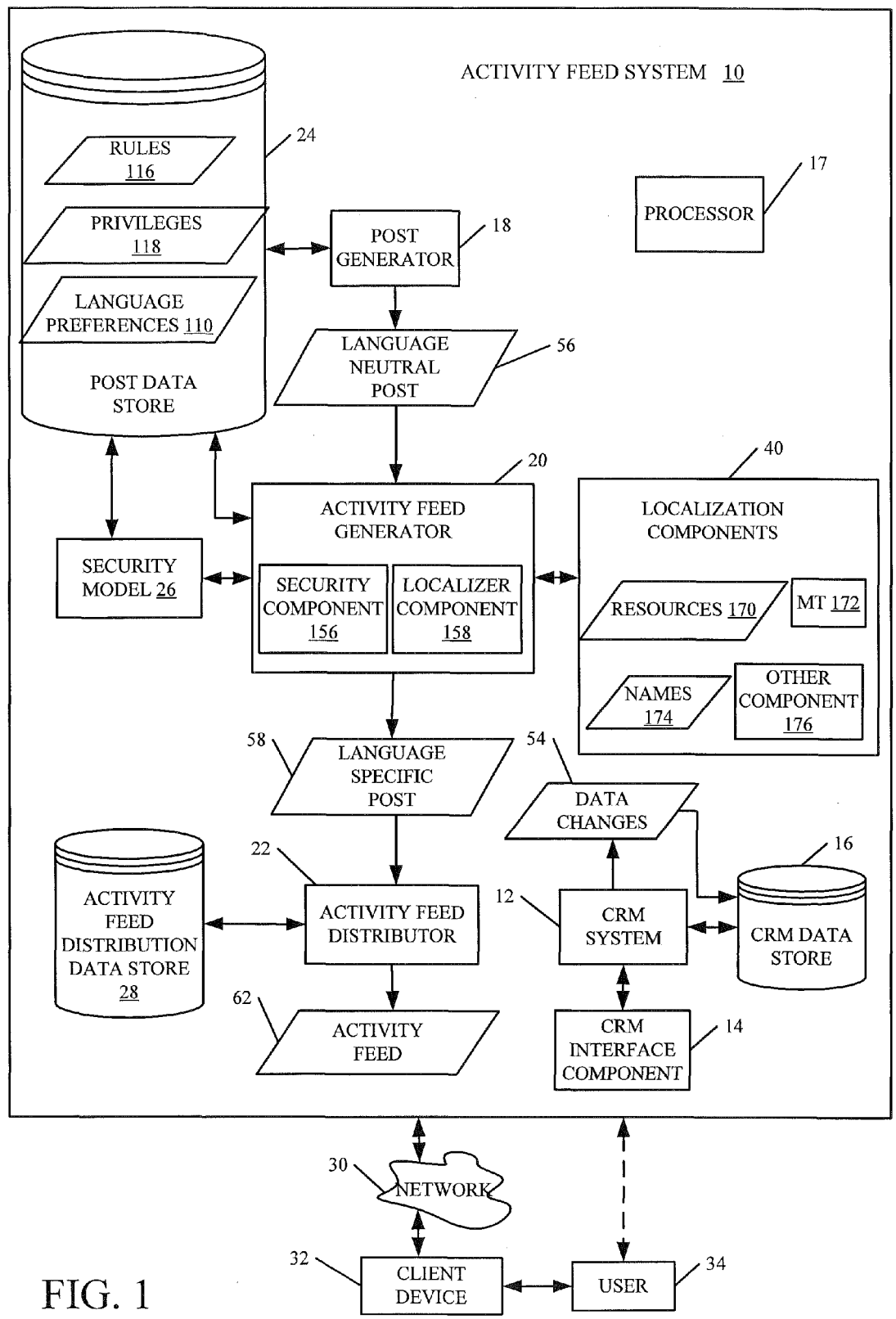
FIG. 1 is a block diagram of one illustrative activity feed system.

FIG. 1 shows one illustrative embodiment of an activity feed system 10. System 10 illustratively includes CRM system 12 that has CRM interface component 14. CRM system 12 is shown with access to CRM data store 16. In the exemplary embodiment discussed herein, CRM system 12 is a customer relations management system that performs customer relations management operations. Of course, activity feed system 10 can be used with other systems and CRM system 12 is described herein for the sake of example only.

Activity feed system 10 also includes post generator 18, activity feed generator 20 (which is coupled to localization components 40), activity feed distributor 22, as well as post data store 24, security model 26 and activity feed distribution data store 28. In the embodiment discussed herein, activity feed system 10 also includes processor 17. In one embodiment, processor 17 is a computer processor activated by the various other components of activity feed system 10, and it enables the functions performed by those components.

In one embodiment, activity feed system 10 is coupled over network 30 to one or more client devices 32. As will be described later with respect to FIGS. 5-8, client device 32 can be a wide variety of different devices, such as mobile devices, desktop or laptop devices, tablet computing devices, cellular telephones, etc.

It will also be noted that system 10 can be deployed on client device 32. Also, portions of system 10 can be deployed on servers or client devices 32 or other devices, as desired. The configuration shown in FIG. 1 is exemplary only.

Figure 1A:
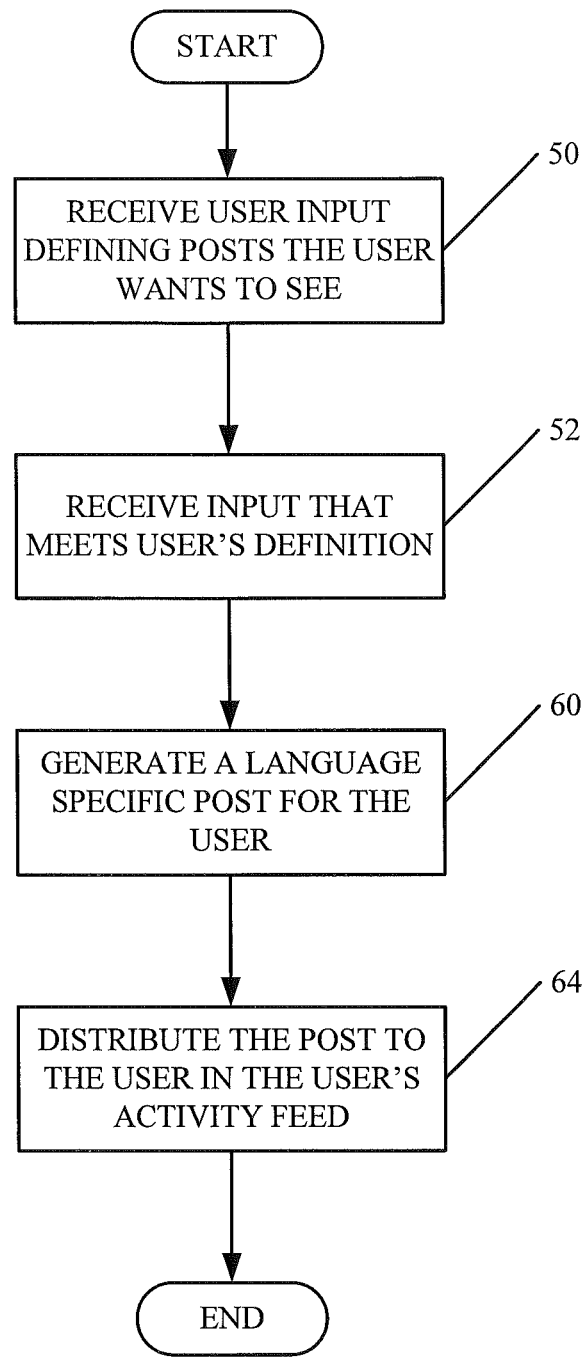
FIG. 1A is a flow diagram illustrating one illustrative embodiment of the overall operation of the system shown in FIG. 1.

FIG. 1A is a flow diagram illustrating the overall operation of activity feed system 10 in accordance with one embodiment. FIGS. 1 and 1A will now be described in conjunction with one another, and some of the steps in FIG. 1A will then be described in greater detail with reference to FIGS. 2-4B.

As shown in FIG. 1, user 34 can access activity feed system 10 either directly (as indicated by the dashed arrow) or remotely through client device 32 and network 30. CRM interface component 14 illustratively generates a user interface display that allows the user 34 to provide inputs to CRM system 12. CRM interface component 14 illustratively first generates a user interface display that allows user 34 to input configuration information that defines the various posts that the user 34 wishes to see. This is described in greater detail below with respect to FIG. 2. Suffice it to say, for now, that the user may specify certain objects or entities stored in CRM data store 16 for which the user wishes to see changes. For instance, if the user is tracking a given account, the user may specify a list of account entities for which the user wishes to view activity. More specifically, the user may specify that, if another user changes the status of one of the accounts, or makes other changes to an account entity listed by user 34, then user 34 may desire to see this as a post on the user's activity feed (sometimes also referred to as an activity stream) that is displayed on the user's wall. Receiving user input defining the posts that the user wishes to see is indicated by block 50 in FIG. 1A.

Activity feed system 10 then receives an input that meets the user's specification. For instance, if the user 34 has specified that the user desires to see activity reflecting the change in the status of a "sales" entity in CRM data store 16, and another user provides an input that changes that status, then activity feed system 10 has received an input that meets the user's definition as described with respect to block 50 in FIG. 1A. Receiving this type of input is indicated by block 52 in FIG. 1A. Such data changes are illustrated, by way of example, by block 54 in FIG. 1.

Post generator 18 then uses localization components 40 to generate a language-neutral post 56 for the user based upon the data changes 54, and provides that information to activity feed generator 20, which generates a language-specific post 58. Generating a language-specific post is indicated by block 60 in FIG. 1A, and examples of this are described in greater detail below with respect to FIGS. 3-4.

Activity feed generator 20 provides the language specific post 58 to activity feed distributor 22 which places the post in an activity feed 62 that is distributed to user 34. This is indicated by block 64 in FIG. 1A.

Figure 1B:
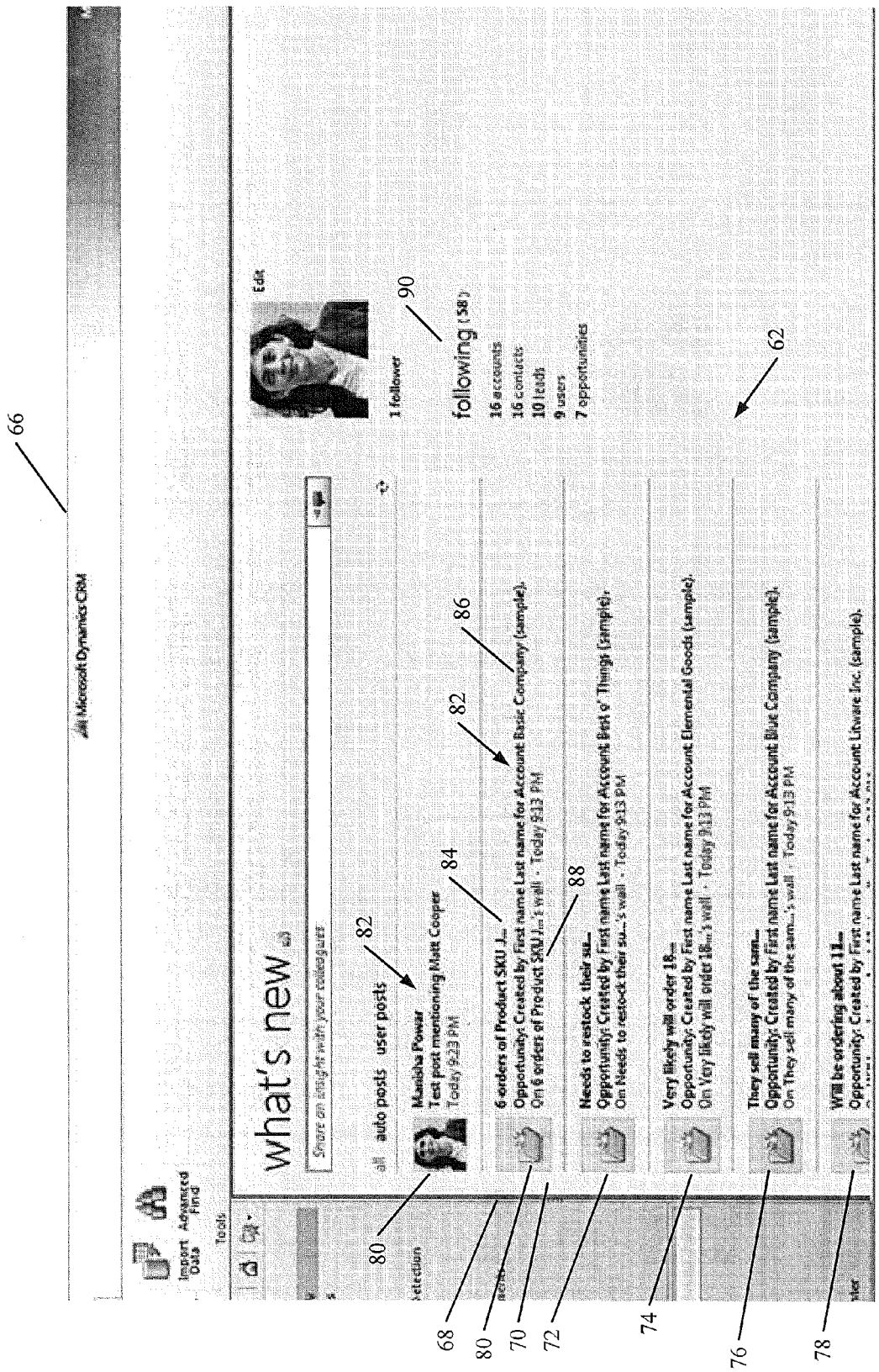
FIG. 1B shows one embodiment of posts in an activity feed distributed to a user and displayed on the user's wall.

FIG. 1B shows a user interface display 66 that illustrates one embodiment of a plurality of language-specific posts 68, 70, 72, 74, 76 and 78 which form a portion of one exemplary activity feed 62 that is provided on a user's wall. FIG. 1B illustrates that, in one embodiment, the posts can be user generated posts, or automatically generated posts, that are automatically generated based on user changes to data or other portions of CRM system 12. For instance, post 68 is a user generated post that has an icon portion 80, along with a post substance portion 82. Icon 80 can illustratively be set by a user or administrator. In the case of a user-generated post 68, in one embodiment, icon 80 is selected by the user that generated the post.

The substantive portion 82 of post 80 may illustratively include a time when the post was made, an identity of the author of the post, and text or another message input by the user that generated the post.

Automatically generated posts 70-78 also illustratively include icon portions that can be set by a user, customized, set by an administrator or automatically selected. Each of the automatically generated posts also illustratively include a substantive portion 82 that has a title 84 that is a title of the post, a description of the activity 86 that describes the activity reflected by the post (such as a change to a data entity), a time the post was generated, as well as a more detailed portion 88 that describes the activity that spawned the post in more detail.

In the embodiment shown in FIG. 1B, the user interface display 66 also includes a "following" section 90. Following section 90 lists the various data entities or other portions of CRM system 12 that the user is following, or for which the user desires to see activity. In the example shown in FIG. 1B, the user is following 16 different account entities, 16 different contact entities, 10 different lead entities, 9 different user entities, and 7 different opportunity entities. All of the entities are in CRM data store 16 shown in FIG. 1. When changes to those entities occur, this user will receive a post reflecting the activity that made the changes. The post will be provided on the activity feed 62 on the wall of this user.

Figure 2:
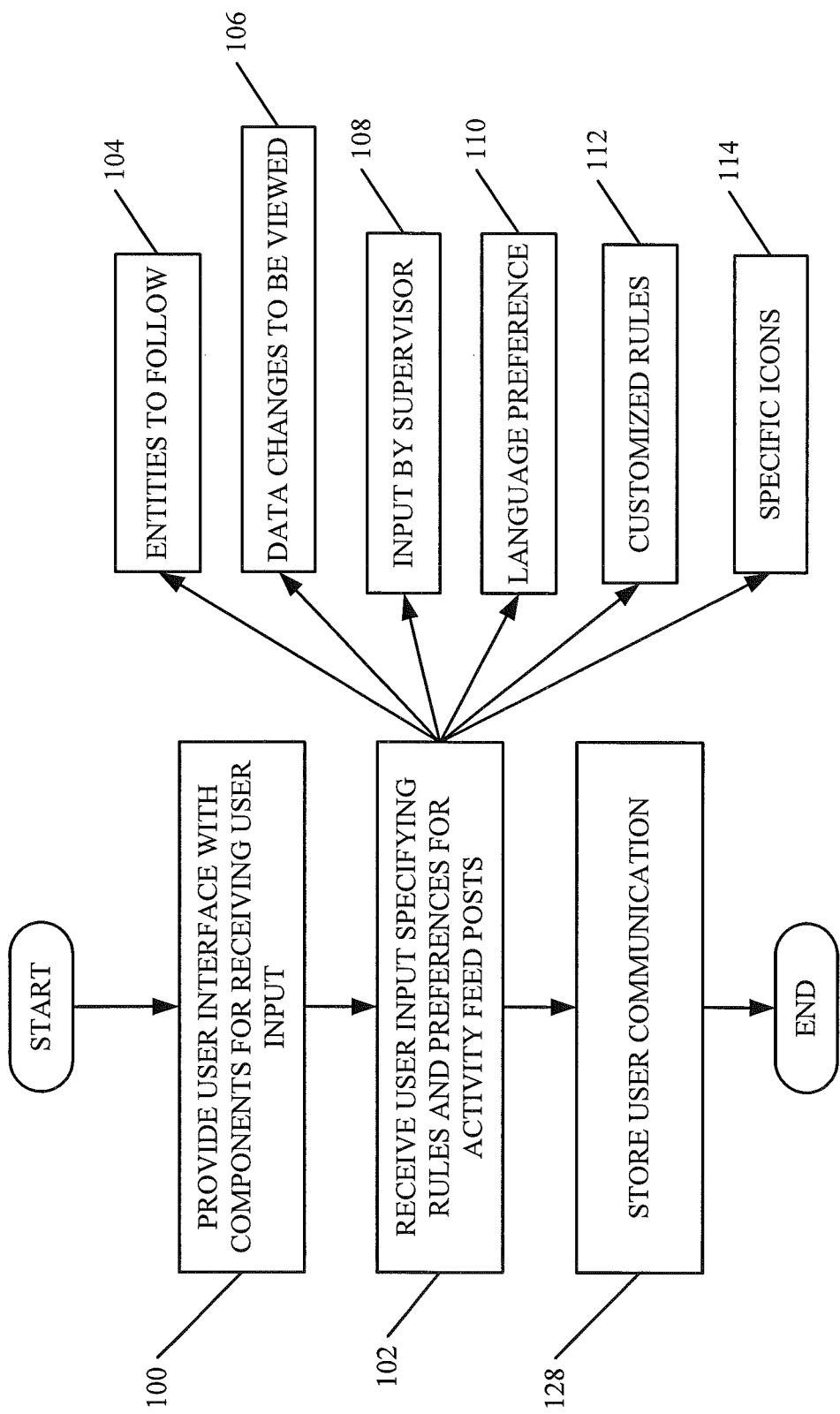
FIG. 2 shows one illustrative embodiment of receiving user preferences.

FIG. 2 is a flow diagram illustrating one embodiment of how a user inputs a definition of posts that the user wishes to see, in more detail. FIG. 2 illustratively corresponds to block 50 in FIG. 1A. In the embodiment shown in FIG. 2, CRM interface component 14 first provides a user interface with user input components for receiving the user input. This is indicated by block 100 in FIG. 2A. Activity feed system 10 then receives the user inputs specifying preferences and the posts the user wishes to see in his or her activity feed posts. This is indicated by block 102 in FIG. 2.

The user's inputs can take a variety of different forms. For instance, the user can illustratively provide his or her language preference. Therefore, when activity is detected and is to be posted to the user's activity stream (or activity feed), it will illustratively be localized to the user's language of preference. Inputting the language preference is indicated by block 110 in FIG. 2.

In addition, the user may be allowed to specify entities that the user wishes to follow. This is indicated by block 104 in FIG. 2, and was also discussed above with respect to section 90 of user interface display 66 in FIG. 1B. The user may also be able to define data changes that the user wishes to view, in other ways. This is indicated by block 106 in FIG. 2. For instance, system 10 can display a pre-defined set of rules that define various changes that will spawn posts. The user can select the rules that are of interest, and when changes are made as defined by the user's selected rules, the user will receive a post reflecting that activity. One embodiment of this is described in more detail below with reference to FIG. 2A.

Similarly, the inputs may be provided by a supervisor of the given user, as indicated by block 108. For instance, if the supervisor of a given sales group wishes all members of his or her sales team to view certain entities, the supervisor can configure this for his or her sales team.

In one embodiment, the user can also create customized rules. For example, if the user does not see an existing rule for identifying activity to be posted to the user's activity feed, the user can create a rule. Customized rules are indicated by block 112 in FIG. 2.

In addition, a user may specify an icon to be used for different posts. For instance, as shown above in FIG. 1B, icons can be associated with individuals, with automatically generated posts, or for individual rules that spawn posts to the user activity stream. Specifying icons is indicated by block 114 in FIG. 2.

Figure 2A:
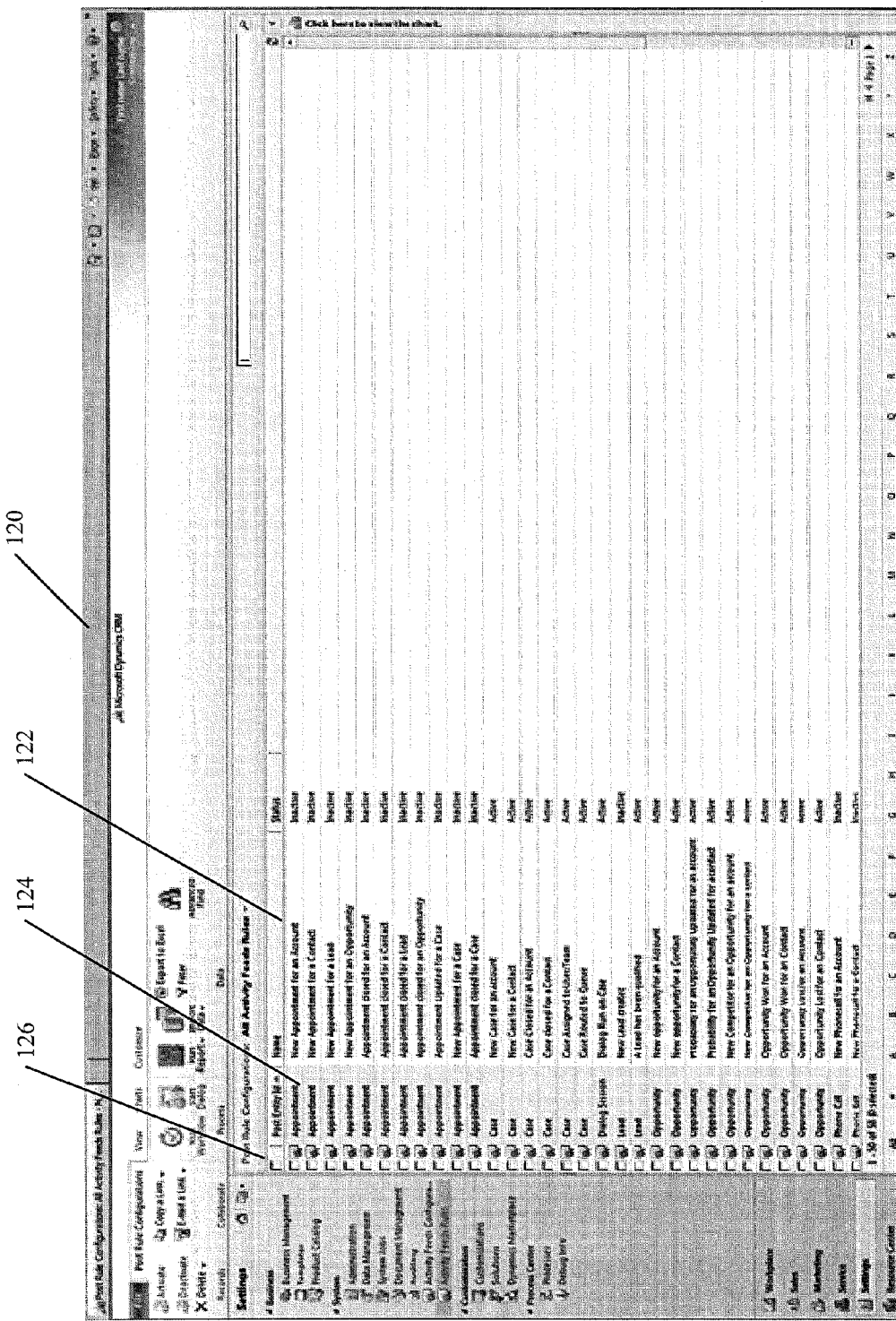
FIG. 2A shows one illustrative user interface display that allows a user to select various rules used in generating posts to the user's activity feed.

FIG. 2A is a user interface display that allows the user to specify rules that are used to spawn posts to the user's activity feed. That is, in one embodiment, CRM system 12 receives data changes 54, post generator 18 accesses data store 20, and specifically accesses rules 116 in data store 10. The rules 116 for a given user, can be activated, or deactivated based upon the user's inputs using the interface shown in FIG. 2A. If the data changes 54 match one of the rules 116, then post generator 18 determines whether that matching rule is active for a given user. If so, then a language neutral post 56 is generated for that user. As discussed below, a post will only be posted to the user's wall if the user has privileges sufficient to view that post. Privileges corresponding to the users of activity feed system 10 are also illustratively stored in a data store, such as store 24, as indicated by block 118 in FIG. 1.

Referring again to FIG. 2A, it can be seen that FIG. 2A is a user interface display 120 generated by CRM interface component 14. Interface display 120 allows a user to either activate or deactivate a set of rules 122 which are displayed. Each rule relates to an entity in CRM system 12, and the specific entity related to a given rule 122 is listed in a list 124 of corresponding entities on display 120. For instance, the first rule on display 120 is "new appointment for an account". Therefore, if the user provides data changes 54 that indicate that a new appointment has been created for a given account, then that specific rule will be matched. The parent entity for that rule is the "appointment" entity. Thus, if the rule "new appointment for an account" is matched, post generator 18 will automatically generate a post for the activity feeds of users that have activated that rule. The users can activate or deactivate each of the given rules simply by placing a check in a check box as shown generally at column 126. Thus, the user can use interface display 120 to activate all of the rules that define activity for which the user wishes to receive a post. Of course, the user interface display 120 shown in FIG. 2A is but one way of receiving user configuration information, and others can be used as well.

In any case, referring again to FIG. 2, once the user has provided all of the desired configuration information, then CRM system 12 stores that information in data store 24, and associates it with this given user. This is indicated by block 128 in FIG. 2.

Figure 3:
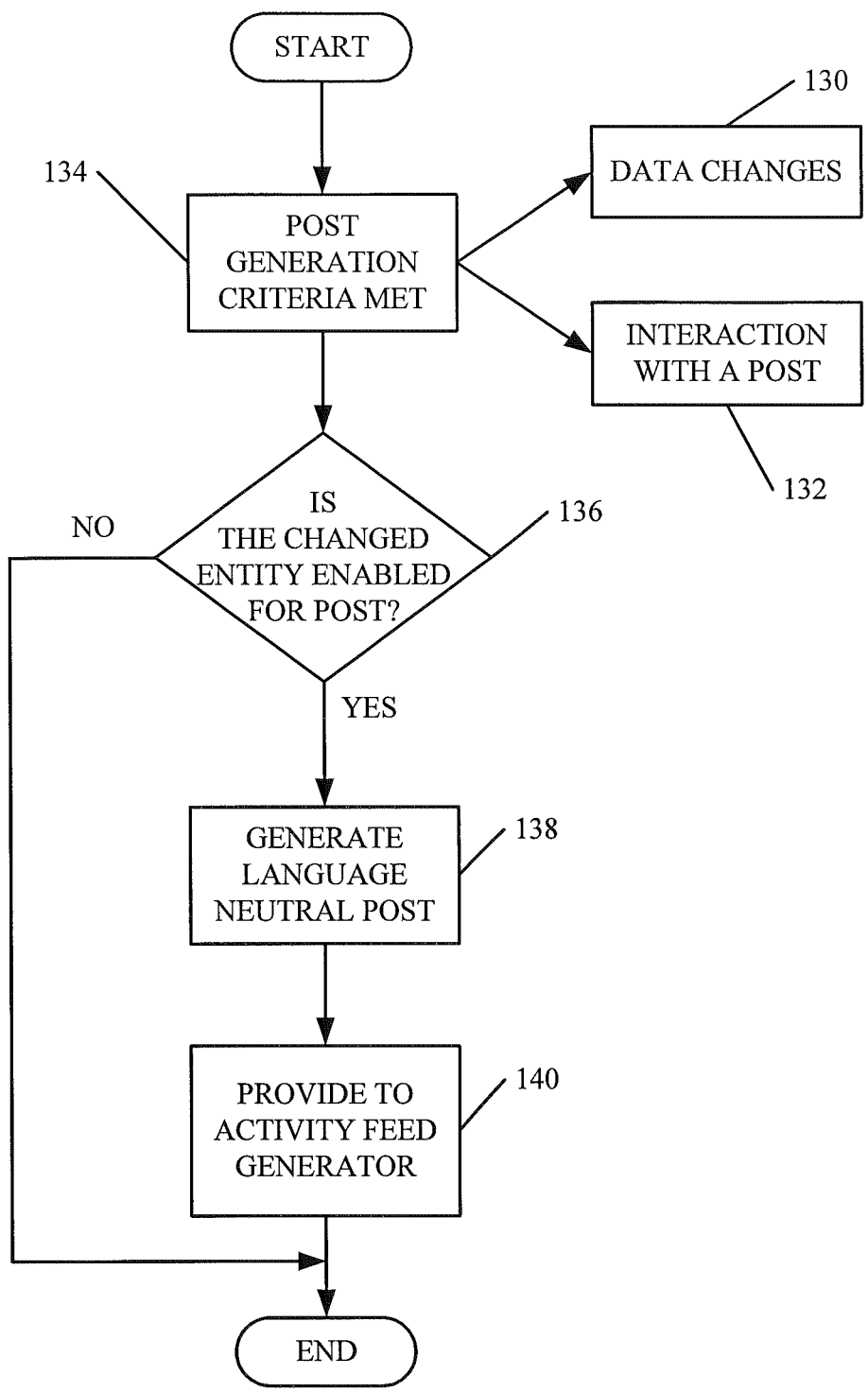
FIG. 3 is a flow diagram illustrating one embodiment of the operation of the system shown in FIG. 1 in creating a language neutral post.

FIG. 3 is a flow diagram illustrating one embodiment of the operation of post generator 18 in generating a language neutral post. By language neutral it is meant that the user language preferences 110 have not been applied to the post yet. Therefore, while the language-neutral post may be generated in a specific language, it is language neutral in that it has not yet been localized using the language preferences input by a user to which the post is to be delivered.

Post generator 18 first determines that a user input has been received that has changed data in a way that meets the criteria input by the given user for receiving posts. For example, the user may input configuration information by selecting rules such that certain types of data changes will trigger generation of a post to be sent to that user in the user's activity feed. Receiving an input that triggers generation of a post is indicated by block 130 in FIG. 3.

By way of example, assume that the user has activated a rule that will generate a post every time a change has been made to a "sales" entity in CRM system 12. Then, if another user makes a change to a "sales" entity, that rule will fire and will cause post generator 18 to determine that it must generate a post for the user. Similarly, of course, the user may input criteria indicating that any time there is an interaction with a previous post, post generator 18 will generate a new post for that as well. For instance, where a previous post has shown that someone made a change to a "sales" entity, and another user "likes" or "comments on" that post, in their activity feed, then this may generate another post for the current user as well. This is indicated by block 132 in FIG. 3. Of course, any or all of the other criteria mentioned above with respect to FIG. 2 for generating a post can be met as well. Determining that the post generation criteria have been met is indicated by block 134 in FIG. 3.

Post generator 18 then determines whether the entity for which the post is generated is enabled or disabled. For instance, in one embodiment even if a user requests to receive posts for data changes made to a given entity, that entity can be enabled or disabled, independently of the user configuration information. Therefore, even if a user has signed up to receive posts for data changes made to a "sales" entity, if that entity is disabled, then there will be no posts generated based on changes made to that entity. Determining whether the changed entity is enabled for posts is indicated by block 136 in FIG. 3.

If, at block 136, the changed entity is enabled for posts, then post generator 18 generates language neutral posts 56 based on changes to that entity. This is indicated by block 138 in FIG. 3.

Post generator 18 then provides the language posts 56 to activity feed generator 20 which converts the language neutral posts into a language-specific post and places it in an activity stream to be distributed. This is indicated by block 140 in FIG. 3 and is described in greater detail below with respect to FIG. 4.

Figure 4:
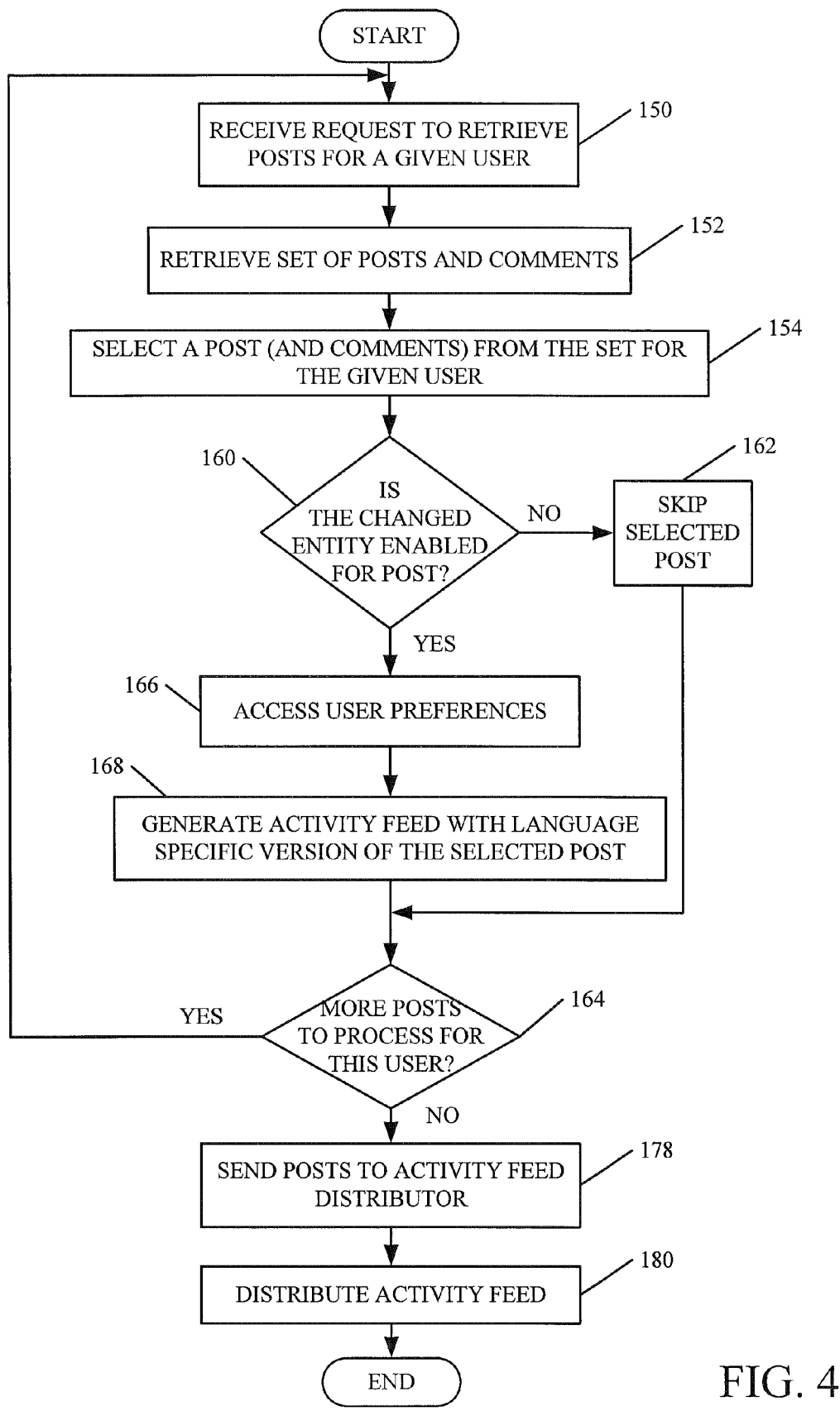
FIG. 4 is a flow diagram illustrating one embodiment of generating a language specific post to an activity feed.

FIG. 4 shows one embodiment for generating a set of language specific posts to be delivered to a user, in the activity feed of that user. It is assumed that at the beginning of FIG. 4, one or more language neutral posts have already been generated by post generator 18, for that user. In order to generate the language specific posts, activity feed generator 20 first receives a request to retrieve posts for a given user. This is indicated by block 150 in FIG. 4. This can be done in a number of different ways. For example, when a user 34 logs onto activity feed system 10, the user's client device 32 may automatically send a request to update the user's activity feed. This can be interpreted as a request to retrieve posts for that given user. Alternatively, even when the user is already logged onto the system, the user may ask to refresh the activity feed, or retrieve current posts. That can be done by interacting with a suitable input mechanism on a user interface display. In any case, activity feed generator 20 receives a request to retrieve posts for a given user.

After receiving the request, activity feed generator 20 retrieves the set of outstanding language neutral posts 56, along with the comments to those posts, for the given user. This is indicated by block 152 in FIG. 4. It will be noted that the set of language neutral posts 56, along with any comments or other user interactions with those posts, can be stored in memory 24, or memory 28, or any other desired memory location. When activity feed generator 20 generates an updated activity feed for a given user, it retrieves those posts and comments.

Activity feed generator 20 then selects one of the posts (along with its comments) from the set of posts retrieved for the given user. This is indicated by block 154 in FIG. 4.

Activity feed generator 20 includes security component 156 and localizer 158. After selecting one of the posts, security component 156 accesses security model 26 to determine whether the given user has access to the parent entity of the selected post. This is indicated by block 160 in FIG. 4. For instance, assume that the user has input configuration information indicating that he or she wishes to receive the 20 latest posts for 10 different accounts. However, also assume that in security model 26, the user does not have clearance to access the "sales" entities for those 10 accounts. In that case, the set of posts generated for the user will include the latest 20 posts for the 10 different accounts, but it will include 20 posts, excluding posts related to the "sales" entity. Therefore, for a selected post, security component 156 accesses security model 26 (which itself uses privileges 118 in data store 24) to determine whether the user has access to (or is privileged to see) the parent entity that spawned the post. If not, then the selected post is skipped and activity feed generator 20 determines whether there are additional post to process for the given user. This is indicated by blocks 162 and 164 in FIG. 4.

In one embodiment, security component 156 and security model 26 operate in a number of different ways, depending upon how a user has been identified to receive a post. For instance, in a first scenario the user may indicate a desire to receive posts by doing a query requesting all posts regarding a given record (such as all posts regarding a given instance of an account entity, or record). In a second scenario, the user may indicate a desire to receive posts by listing which records (or entities) the user wishes to follow. That is, when there is a change to any of those entities that the user is following, the user wishes to receive a post indicative of that change. In a third scenario, the user may wish to retrieve multiple posts, from multiple entities, that meet certain conditions. For instance, the user may generate a query showing that the user wishes to retrieve "all posts for all record instances created today." In that case, the user wishes to receive multiple posts that meet the condition that they were spawned by an entity instance that was created today. In one embodiment, the security component 156 and security model 26 can handle the security checks performed for each of these scenarios in a different way.

In the first scenario, where the user just wants to see all posts regarding an identified record (such as a specific instance of an account entity) security component 156 accesses security model 26 to simply determine whether this user has read access to this instance of the account entity. If so, then those posts are provided to the user. The read access that a user has to a given entity can be cached in a user cache corresponding to the user and stored in security model 26. Therefore, component 156 can access the security model 26 which stores user security information corresponding to each individual user, in a user cache for that user, to see whether the user has read access to the instance of the entity that spawned the post.

In the second scenario, the user has marked a given entity as an entity that the user wishes to follow. Therefore, the user desires to see posts indicative of activity regarding the listed entities. Assume, for the present example, that the user has indicated that they wish to receive all posts for the following entities: Account 1, Account 2, and opportunity. In one embodiment, as soon as the user adds these entities to the user's "following" list, security component 156 accesses security model 26 to determine, at that moment, whether the user has read access to the listed entities. If so, these entities are added to the user's following list and the list is cached in the user's cache. If the user ever loses read access to any of the "followed" entities, this fact may be recorded in security model 26 and security component 156 simply deletes that entity from the user's "following" list. Therefore, the user's read access to the entities on the user's "following" list can be periodically re-evaluated, or those entities can simply be deleted from the user's list, if the user loses read access to them. By using the latter method, a change in the user's read access to a given entity is taken care of immediately by deleting that entity from the user's "following" list.

In the final scenario, the user has asked to receive multiple posts from multiple different entities (or records) that meet some conditions. In that scenario, security component 156 accesses security model 26 and dynamically evaluates which particular records the user has read access to, and which of those meet the conditions specified by the user. In doing this, component 156 can use security attributes corresponding to the records themselves. Some security attributes, by way of example, include the objects owner ID (the identity of the person that created the object or the instance of the object), the owner ID type (the type or role of that individual) and the business unit within a given organization that owns this instance of the object.

By way of example, some corporations or organizations are divided into a hierarchical level of business units and subunits. Different users can have access to entities that were created at, or owned by, different levels within the organization. Security component 156 can access theses properties and security levels in security model 26 to determine whether the calling user has access to certain entities for which posts have been spawned.

Table 1 below shows one example of how component 156 uses security model 26 to dynamically compute this. In the example of Table 1, component 156 is considering three entities, the "account" entity, the "contact" entity and the "lead" entity. Each of those entities is shown in the example as being associated, for this particular user, with a read access level that is stored in the security model 26. The "global" read access level means that the user has access to all instances of the identified entities. The "deep" access level means that the user has access to instances of entities owned by, or created from, the user's business unit or by all child business units of the user's business unit. The "basic" access level indicates that the user only has access to instances of the identified entity that the user has created, or that the user owns.

For the specific example shown in Table 1, it can be seen that the user has a "global" access level to the "account" entity so the user can have access to posts from all instances of account entities. The user has "deep" access to the contact entities, so the user can view posts spawned by instances of contact entities that were generated by, or owned by, the user's business unit or child business units. The user has "basic" access to the lead entity meaning that the user can only view posts spawned by an instance of a lead entity that was created by the user, or that is otherwise owned by the user. These access levels to the various entities can be either precomputed and stored in the user's cache in user model 26, or they can be dynamically computed. Of course, these are exemplary security levels only and different, fewer or additional levels could be used as well.

Component 156 then performs a set of select and union operations to gather posts spawned from the account, contact and lead entities, given the security parameters discussed above, for this user. Basically, in the example in Table 1, component 156 filters the posts by using SQL statements in Table 1 to use the security attributes to find which instances the user has read access to.

TABLE 1

```
-- EXAMPLE of optimized generated query by SqlGenerator if
precomputed MaxPrvDepth is in user cache (or computed dynamically)
--          for each feed enabled otc:
--   entity     otc    MaxPrvRead
--   account    1      Global
--   contact    2      Deep - 2 BUs
--   lead       4      Basic
declare @caller00 uniqueidentifier
-- generated parameters per caller
declare @buId100 uniqueidentifier
        , @buId01 uniqueidentifier
        , @team00 uniqueidentifier
select * from PostItem p
where
-- <user_conditions> -- this will be user owned feeds : my feeds, my
teams feeds, etc
-- and -- authorization condition: read access to RegardingObject
p.PostItemRegardingId in
(
-- union for all feed enabled otc with Global depth of prvRead
```

TABLE 1-continued

```
select PostItemRegardingId from PostItemRegardingBase where
    RegardingObjectTypeCode = @otc00 -- account
union -- union for all feed enabled otc with Local or Deep depth
of prvRead
select PostItemRegardingId from PostItemRegardingBase where
    RegardingObjectTypeCode = @otc10 -- contact
        and RegardingObjectOwningBusinessUnit in (@buId00,
        @buId01)
union -- union for all feed enabled otc with Basic depth of
prvRead
select PostItemRegardingId from PostItemRegardingBase where
    RegardingObjectTypeCode = @otc20 -- lead
        and RegardingObjectOwnerId in (@userid, @team00)
union -- shared instances - only for feed enabled entities with
basic/local/deep depth
    prvRead
select distinct pir.PostItemRegardingId from PostItemRegardingBase
pir WITH
    (NOLOCK)
        join PrincipalObjectAccess POA WITH (NOLOCK) on
            pir.RegardingObjectId = POA.ObjectId
                and pir.RegardingObjectTypeCode =
                POA.ObjectTypeCode
        -- NOTE: in one emboidment, this can be optimized further
            depending on user's team, private attribute presents, etc
        -- as union on OTC value
        join SystemUserPrincipals sup WITH (NOLOCK) on
            POA.PrincipalId = sup.PrincipalId
    where POA.ObjectTypeCode in (@@otc10, @otc20) -- contact,
    lead and
        ((POA.AccessRightsMask|POA.InheritedAccessRightsMask) &
        1) = 1
    and sup.SystemUserId = @caller00
```

Assuming that, at block 60, security component 156 determines that the given user does have access to the parent entity for the selected post, then localizer component 158 accesses the user's language preferences 110 in data store 24 to determine what language the language neutral post is to be translated into. Accessing the user's preferences is indicated by block 166 in FIG. 4.

Localizer component 158 then accesses localization components 40 to generate the activity feed with a language specific version of the selected post. This is indicated by block 168 in FIG. 4 and this can be done in a number of different ways. In the embodiment shown in FIG. 1, localization components 40 include localized resources 170, machine translation components 172, a list of user and entity names 174 or other localization components 176. In one embodiment, fragments of the text in a language neutral posts 56 have already been translated and stored as localized resources 170, in a variety of different languages. If those sentence fragments appear in the language neutral posts, then localizer component 158 can simply retrieve the translated text in the language preferred by the given user, for whom the language specific post is being generated.

In another embodiment, certain user names or entity names or other names 174 are found in CRM system 12 as well. Those names are translated in some cases, while in other cases, they are not translated. In any case, the appropriate language-specific version of the names can be retrieved and placed in the language-specific post. For other texts, for which no translation is available, machine translation components 172 can be used to translate those text fragments, on the fly, and return a translated version of the text fragments. Other localization components 176 can be used to localize various other portions of the language neutral post as well. Localizer component 158 then assembles the localized text fragments into the localized (or language specific) post.

When all of the posts to be processed for this given user have been localized, the set of posts are sent to activity feed distributor 22. Activity feed distributor 22 accesses activity feed distribution store 28, which includes a list of users that are to receive the given activity feed generated by generator 20. This can be stored in activity feed distribution data store 28 in a variety of different ways. For instance, data store 28 can store the "followers" of a given entity. In addition, it can store the identity of the users that are receiving activity feeds, or the location of those users, or a combination of these items. In any case, activity feed distributor 22 receives and distributes the activity feed 62 including the posts which have just been converted to language specific posts 58. This is indicated by blocks 178 and 180 in FIG. 4.

One example of how a language neutral post is localized will now be discussed in greater detail. Table 2 shows a sample XML rule definition that can be used to generate a post. In the example discussed with respect to Table 2, it is assumed that CRM system 12 has an entity referred to as an "opportunity" entity. The opportunity entity includes information related to a sales opportunity that is being followed by some users of CRM system 12. The opportunity entity also includes fields, such as a "close probability" field. The close probability field indicates the probability that the sales opportunity will be closed by a sales person. For instance, if a given sales person believes that the probability of closing the sale represented by this "opportunity" entity has increased from 10 percent to 80 percent, that sales person may change the "close probability" field on the "opportunity" entity from 10 percent to 80 percent. There may be users of CRM system 12 that wish to receive a post when the "close probability" field for a given "opportunity" have been changed. If a user does desire to receive a post when that happens, and has checked the rule corresponding to that activity, then activity feed system 10 will generate a post for that user, when that activity occurs (when a sales person changes the close probability field on the opportunity entity).

Table 2 below shows an example of an XML rule definition.

TABLE 2

```
Sample XML rule definition:
<?xml version="1.0" encoding="utf-8"?>
 <AutoPostRule disabled="false">
<SdkMessageProcessingStep Name="ActivityFeeds.Plugins.OpportunityUpdate:
Update of opportunity for ProbabilityUpdate">
<PrimaryEntity>opportunity</PrimaryEntity>
<Configuration>
<ConfigurationParameters>
<PostTemplateId>Account.Opportunity.ProbabilityUpdate.Post</PostTemplateId>
<PostEntity>account</PostEntity>
</ConfigurationParameters>
</Configuration>
<FilteringAttributes>closeprobability</FilteringAttributes>
```

TABLE 2-continued

```
</SdkMessageProcessingStep>
</AutoPostRule>
```

The XML rule definition set out in Table 2 includes a variety of different portions. The XML fragment:
<PrimaryEntity>opportunity</PrimaryEntity>
 identifies the particular entity that this rule applies to.
The XML fragment:
<FilteringAttributes>closeprobability</FilteringAttributes>
 identifies which field must change for the rule to apply.
The XML fragment:
<PostTemplateId>Account.Opportunity.ProbabilityUpdate.Post</PostTemplateId>
 identifies the name of the localized resource to be used for the post in this given activity. The resource may be stored as one of localized resources 170 in localization components 40 (in FIG. 1). One example of such a localized resource for the activity described with respect to Table 1 is shown below:
{0} changed {1} from {2}% to {3}%.

Where: {0} is the name of the user (such as a sales person) who made the change to the identified field. This value is illustratively stored as a name in the language neutral post 56 for which this language specific post 58 is being generated.

{1} is the field name "probability" which can be localizable and customizable. Language neutral posts illustratively contains a tag that is substituted at render time to the current field name for "probability" for the requesting users organization and localized to that locale.

{2} is the value of "probability" prior to the change, and this is stored in the language neutral post 56 as well.

{3} is the value of "probability" after the change, and this is also stored in the language neutral post.

In one embodiment, localization components 40 include variations on the string shown above that are correct for each of the various languages that the current CRM system 12 supports. Of course, in various languages, the word order might change for proper localization. By way of example, the following four strings show how the placeholders change order in the string relative to the language for which they are localized. The four examples below are for English, Arabic, French and Kazakh:
English
{0} changed {1} from {2}% to {3}%.
Arabic
%{قام {0} بتغيـــــــير {1} من {2}% الى {3}
French
{0} a modifié {1} de {2}% à {3} %
Kazakh
{0} {1} ішінен {2}% {3}% өзгертті.

One example of an XML format for storing a language neutral post is set out in Table 3 below, along with comments.

TABLE 3

```
<pi id="Account.Opportunity.ProbabilityUpdate.Post" icon="0"> -->Id
for Formatting in 40 Languages
<ps>
<p type="1" otc="8"
id="63857c17-04eb-e011-80e6-00155d8a2749">Jack Sparrow</p> --
>Information to get the Name "Jack Sparrow"
<p type="2" otc="3" a="closeprobability" /> --> Information to get
the Name "Probability" in user preferred language
<p type="1" otc="3" id="90e5858e-2fee-e011-a7ad-00155d8a2749">Rush
order: CX11</p>
--> Information to get the Name "Rush order:CX11"
<p type="3" otc="3" a="closeprobability">0</p> --> Information to
```

TABLE 3-continued

```
display the value of probability in user preferred language /locale settings
<p type="3" otc="3" a="closeprobability">10</p>
</ps>
</pi>
```

Figure 4A:
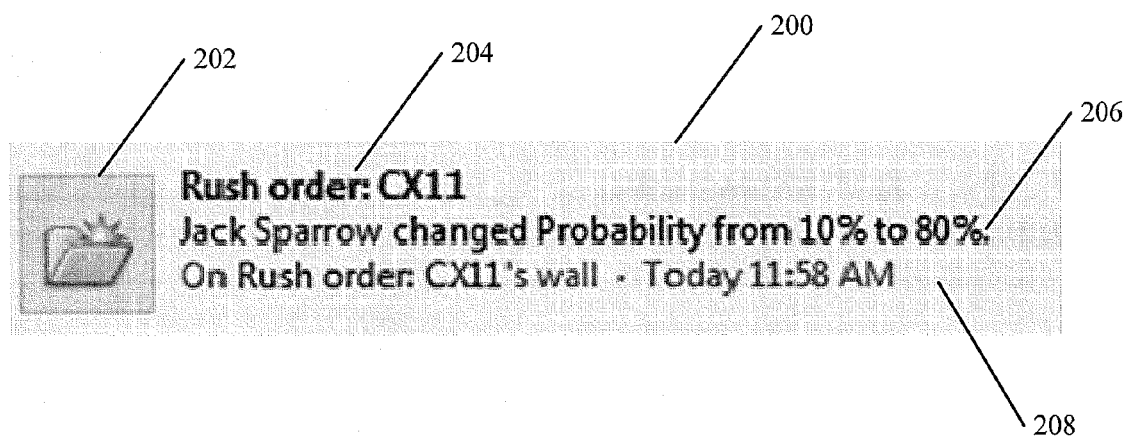
FIG. 4A is one example of a language-specific post.

FIG. 4A shows one illustrative embodiment of a language specific post that has been localized to the English language. It can be seen that the language specific post 200 illustratively includes an icon 202 which can be customized or automatically generated, along with a title portion 204 that identifies the particular order associated with the "opportunity" entity under consideration. The text fragment 206 shows that the user who made the change to the "probability" field is "Jack Sparrow". It also shows that he changed the probability value in that field from 10 percent to 80 percent. In addition, post 200 can include additional information 208, such as the time and day that the post was created, as well as the identity of any other walls on which the post 200 is displayed.

Figure 4B:
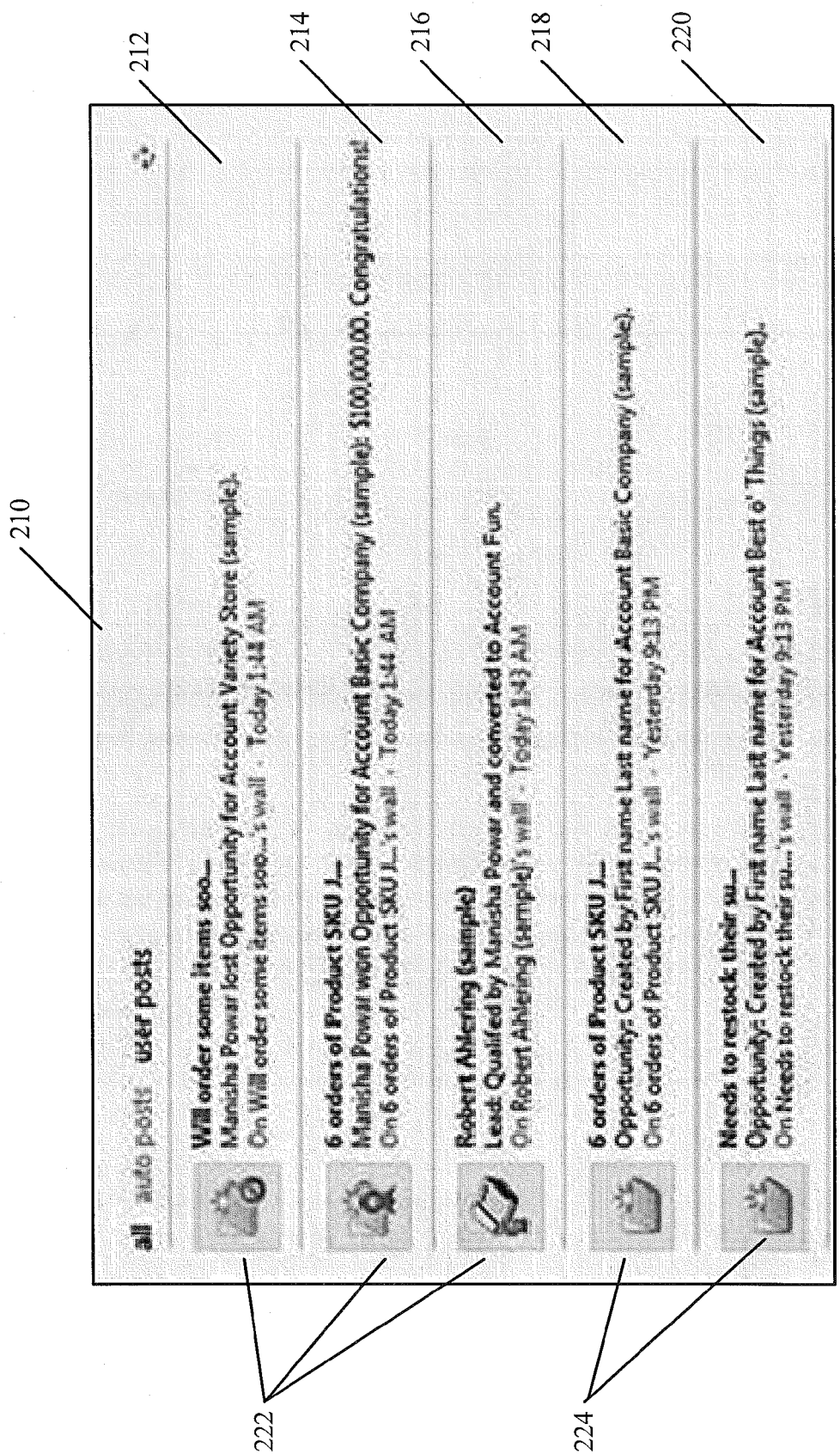
FIG. 4B is a user interface display showing various features of posts in an activity feed.

FIG. 4B shows another feature that can be used. In the configuration information input by a given user, the user may specify that a given entity has a customized icon associated with it. This may be helpful, for example, if a user is using a small screen device. A customized icon may help the user to more quickly identify the particular entity for which the post is generated.

By way of example, the activity feed 210 shown in FIG. 4B includes five posts 212, 214, 216, 218 and 220. The first three posts 212-216 include customized icons 222 associated with each post. The final two posts include automatically generated icons 224 that are associated with each of those posts 218 and 220. In order to customize an icon, a user may be allowed to select one from a list of available icons, or to import an icon, or to otherwise identify an icon to be used with posts for a given entity.

It should also be noted that, in one embodiment, the icons generated for posts can vary based upon the devices that they are displayed on. For instance, dynamic icons might be displayed on a small screen device while static icons may be displayed on a relative large screen device. Of course, other devices and icons can be used as well.

It should also be noted that the rules mentioned herein are exemplary only. A wide variety of different rules can be generated either by a user inputting a customized rule, or by the system itself. The rules can allow a user to select a wide variety of different posts. For instance, a user can aggregate posts in a given rule and ask for the last 20 posts to given accounts or given entities. The user can also more specifically identify criteria for a given post, such as generating a post for a given entity only when a certain field is changed on that entity.

Figure 5:
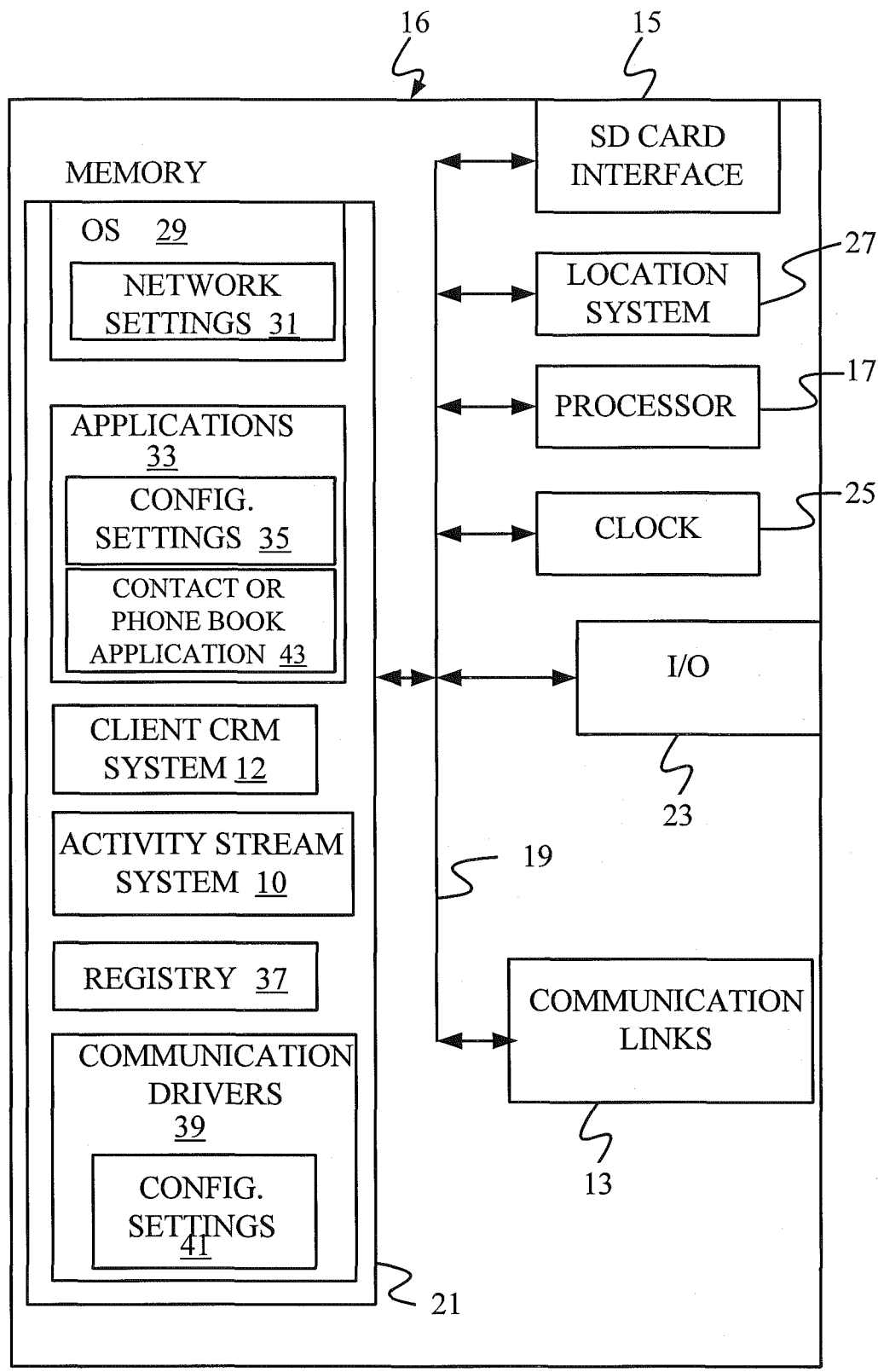
FIGS. 5-7 illustrate various embodiments of client devices.
Figure 6:
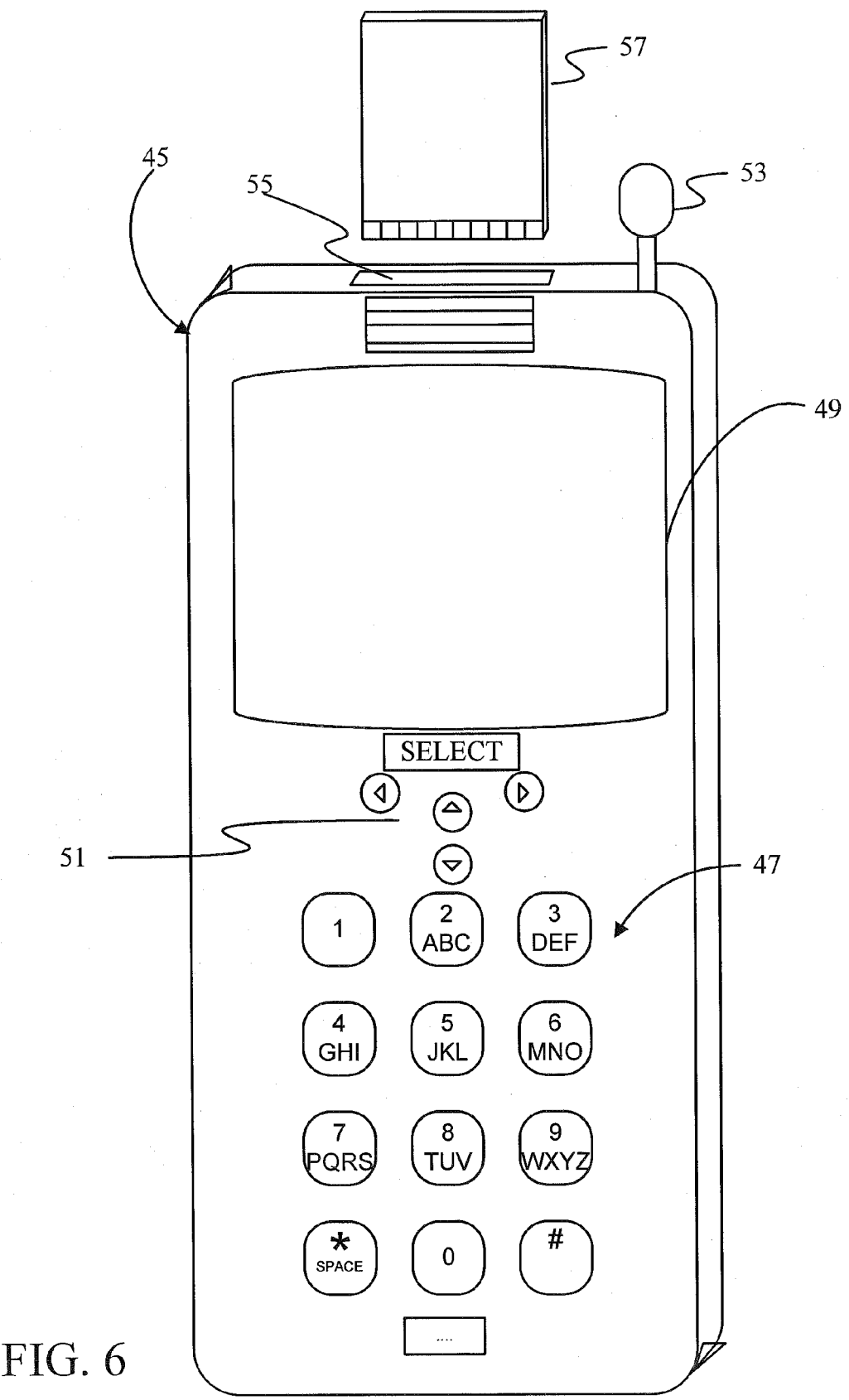
Figure 7:
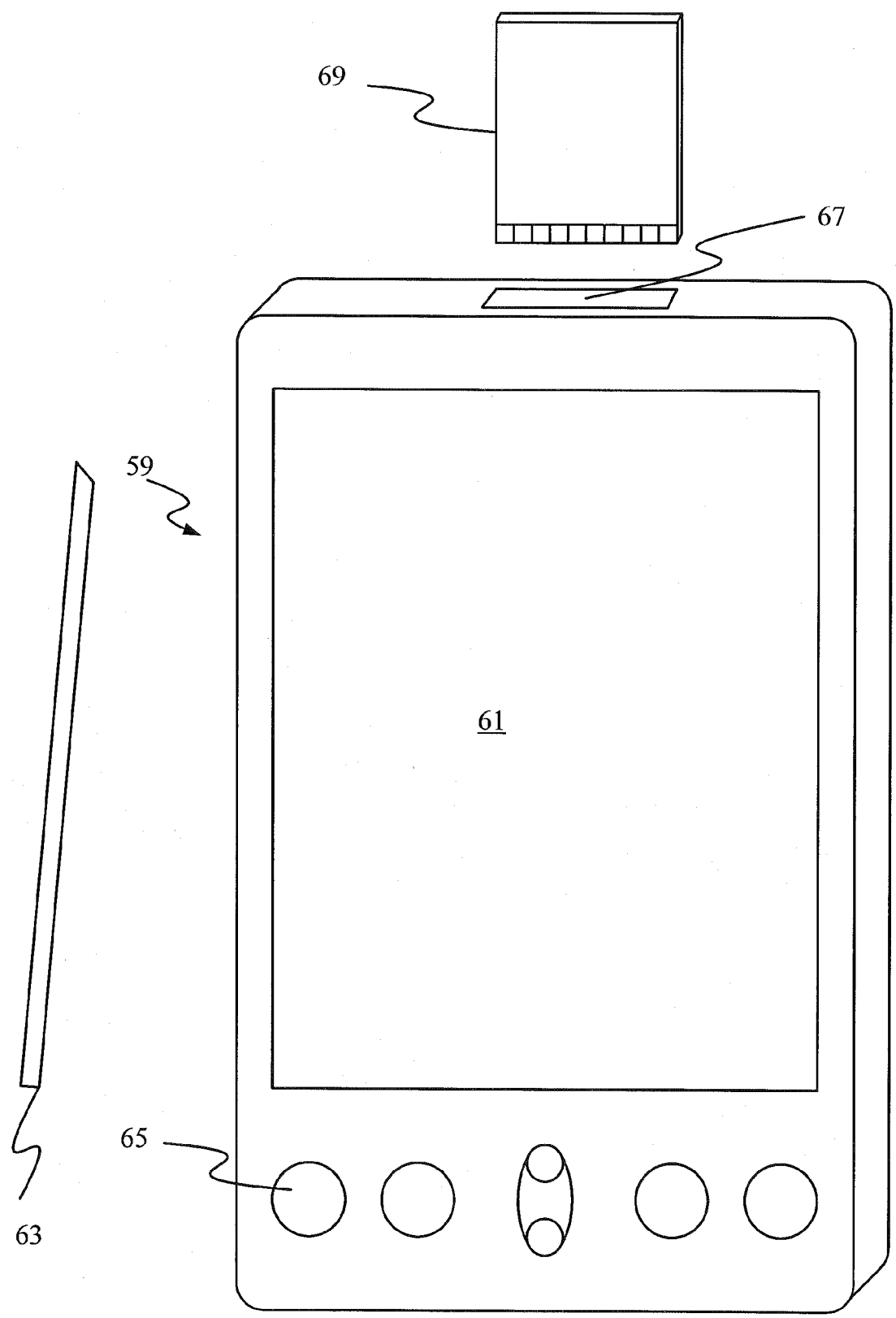

In any case, FIG. 5 is a simplified block diagram of one illustrative embodiment of a handheld or mobile computing device that can be used as client device 32, in which the present system can be deployed. FIGS. 6 and 7 are examples of handheld or mobile devices.

FIG. 5 provides a general block diagram of the components of a client device 32 that can run components of system 10 or that interacts with system 10, or both. In the device 32, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 10) are received on a removable Secure Digital (SD) card that is connected to a SD card interface 15. SD card interface 15 and communication links 13 communicate with a processor 17 (which can also embody processor 17 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 32 can include input components such as buttons, touch sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 32. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, registry 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 10 or the items in data store 16, 24 and 28, for example, can reside in memory 21. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 32 or applications that are installed during use, although these can be part of operating system 29, or hosted external to device 32, as well.

FIGS. 6 and 7 provide examples of devices 32 that can be used, although others can be used as well. In FIG. 6, a smart phone or mobile phone 45 is provided as the device 32. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 7 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 32 are possible. Examples include tablet computing devices, music or video players, and other handheld computing devices.

It will also be noted that as shown in FIG. 1, system 10, or various components of system 10, can reside elsewhere, other than on client device 32. For instance, it could be embodied in a cloud computing environment. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 10 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client device 32 directly, or in other ways.

Figure 8:
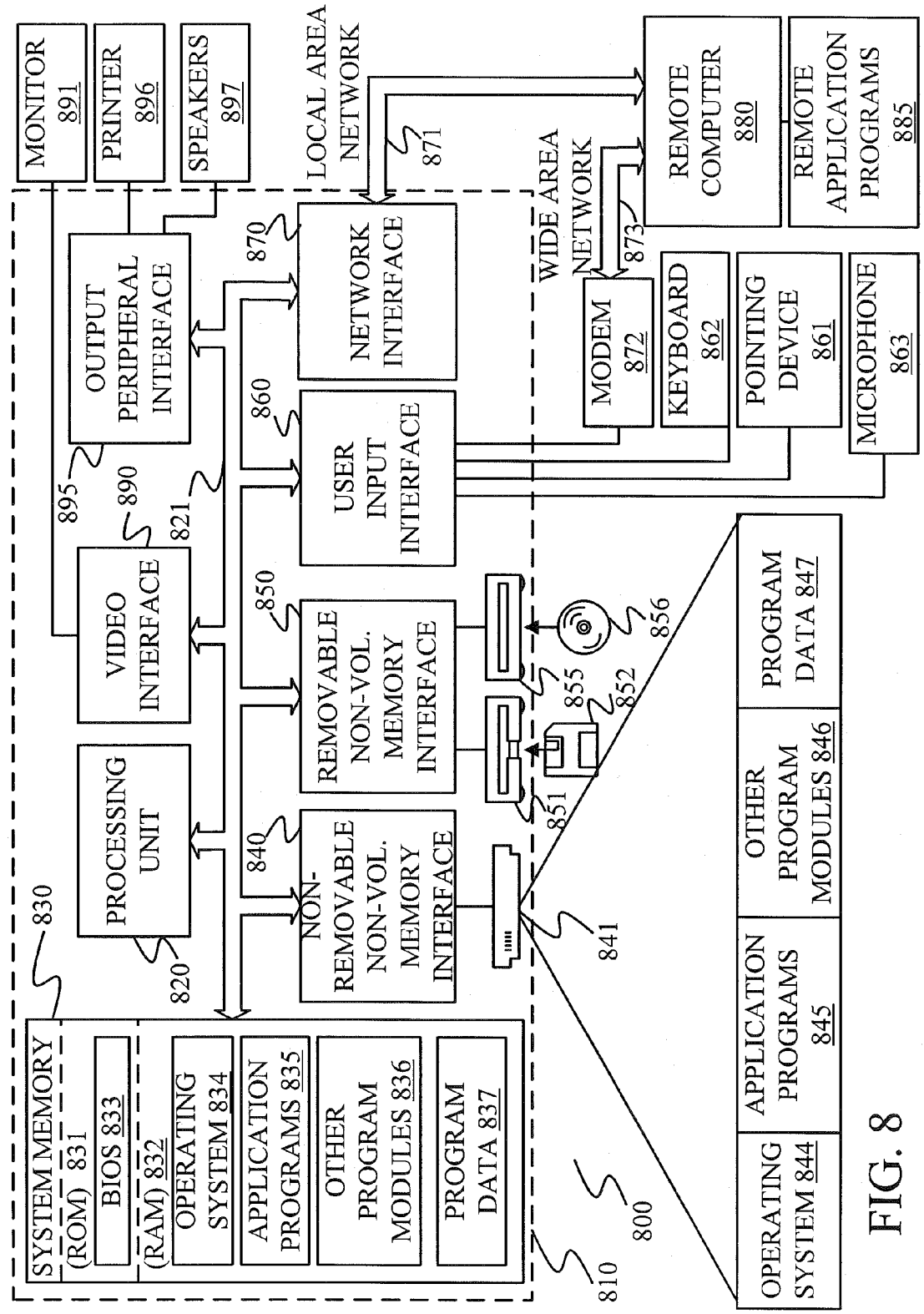
FIG. 8 shows one illustrative embodiment of a computing environment.

FIG. 8 is one embodiment of a computing environment in which system 10 (for example) can be deployed. With reference to FIG. 8, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media does not include communications media and includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. They can also include search components 802 and 804.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of distributing changes to an application, using a computer with a processor, the method comprising:
   receiving a change input indicative of a change made to the application;
   identifying the change made to the application as being a change of interest for which a post is to be generated for a given user;
   generating a language neutral post indicative of the change made to the application;
   generating a language specific post, using the processor, based on the language neutral post; and
   publishing the language specific post to an activity feed for the given user.

2. The computer-implemented method of claim 1 and further comprising:
   receiving configuration inputs indicative of the changes of interest, for which posts are to be generated for the given user; and
   storing the configuration inputs for the given user.

3. The computer-implemented method of claim 2 wherein identifying the change made as being a change of interest by comparing the change input to the configuration inputs.

4. The computer-implemented method of claim 3 wherein receiving the configuration inputs comprises:
   receiving an indication of a set of selected rules defining changes to entities in the application.

5. The computer-implemented method of claim 4 wherein receiving the indication of the set of selected rules comprises:
   displaying a set of predefined rules defining changes to the entities;
   displaying a user selection input mechanism that allows user selection of each of the predefined rules; and
   receiving user selection of a set of the predefined rules through the user selection input mechanism.

6. The computer-implemented method of claim 3 wherein receiving configuration inputs comprises:
   receiving an entity of interest input indicative of an entity in the application for which the user wishes to receive posts.

7. The computer-implemented method of claim 6 wherein identifying the change made as being a change of interest comprises:
   identifying that the change made comprises a change to an entity of interest.

8. The computer-implemented method of claim 7 wherein the entity of interest input is indicative of a field of interest within an entity of interest.

9. The computer-implemented method of claim 8 wherein identifying the change made as being a change of interest comprises:
   identifying that the change made comprises a change to the field of interest in the entity of interest.

10. The computer-implemented method of claim 6 wherein receiving the entity of interest input comprises:
    receiving a follow input indicative of an entity the user wishes to follow as the entity of interest.

11. The computer-implemented method of claim 2 wherein receiving configuration inputs comprises:
    receiving a language identifier input indicative of a language of preference for the language-specific post.

12. The computer-implemented method of claim 11 wherein generating a language specific post comprises:
    receiving the language neutral post;
    accessing the language identifier for the given user; and
    generating the language specific post in the language of preference identified by the language identifier.

13. The computer-implemented method of claim 1 and further comprising:
    accessing security information corresponding to the given user; and
    selectively publishing language specific posts to the activity feed of the given user based on the security information corresponding to the given user.

14. The computer-implemented method of claim 13 wherein selectively publishing comprises:
    publishing the language specific post to the activity feed of the user only if the security information corresponding to the given user indicates that the given user has clearance to access an entity that spawned the language specific post.

15. The computer-implemented method of claim 6 wherein receiving the entity of interest input comprises:
    receiving an aggregation input indicative of an aggregation of a plurality of different entities of interest.

16. The computer-implemented method of claim 6 wherein the configuration information comprises:
    an icon identifier identifying an icon to be used in publishing posts for the entity of interest.

17. The method of claim 6 and further comprising:
    prior to generating the language neutral post, determining whether the entity of interest, for which the post is to be generated, is enabled for post generation; and
    only generating the language neutral post if the entity of interest is enabled for post generation.

18. An activity feed system, comprising:
    an application, that includes entities, shared by a plurality of different users;
    a rules data store storing rules that identify changes made to the entities, a given user having a corresponding set of activated rules that identify entities of interest to the user that, when changed, are to generate posts for the given user;
    a language preferences data store that stores language preferences for the given user;
    a post generator that generates language neutral posts based on changes made to the entities;
    an activity feed generator that accesses the rules corresponding to the given user and the language preferences corresponding to the given user and generates language specific posts identifying changes made to the entities of interest to the given user in a language identified by the language preferences for the given user; and
    an activity feed distributor that distributes the language specific posts in an activity feed for the given user.

19. The activity feed system, comprising:
    a security model that accesses privileges corresponding to the given user to determine whether the given user has privileges to receive the language specific post, the activity feed generator generating the language specific post only if the given user has privileges to see the entity of interest used to generate the language specific post.

20. A computer-implemented method, comprising:
    receiving configuration inputs identifying selected rules that define changes to entities of interest in a customer relations management application, for which posts are to be generated for a given user;
    receiving a language preference for the given user;

receiving a change input indicative of a change made to an entity of interest in the customer relations management application;
   identifying the change made to the entity as being a change of interest for which a post has been requested by the given user by comparing the change made to the selected rules for the given user;
generating a language neutral post indicative of the change made;
accessing a security model to determine whether the given user has privileges to access the entity of interest for which the language neutral post has been generated;
generating, using a computer processor, a language specific post, based on the language neutral post, using the language preference for the given user, if the user has privileges to access the entity of interest; and
publishing the language specific post to an activity feed for the given user.

\* \* \* \* \*